T. J. Mayall,
Loom-Picker.

Nº 17,468.  Patented Jun. 2, 1857.

UNITED STATES PATENT OFFICE.

THOMAS J. MAYALL, OF ROXBURY, MASSACHUSETTS, ASSIGNOR TO HIMSELF, AND GEO. N. DAVIS, OF BOSTON, MASSACHUSETTS.

PICKER FOR LOOMS.

Specification of Letters Patent No. 17,468, dated June 2, 1857.

*To all whom it may concern:*

Be it known that I, THOMAS J. MAYALL, of Roxbury, in the county of Norfolk and State of Massachusetts, have made certain new and useful Improvements in Pickers for Looms, of which the following is a full, clear, and exact description, reference being had to the accompanying drawings, in which—

Figure 1:
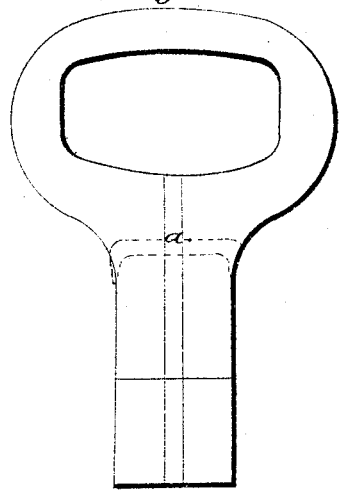
Figure 2:
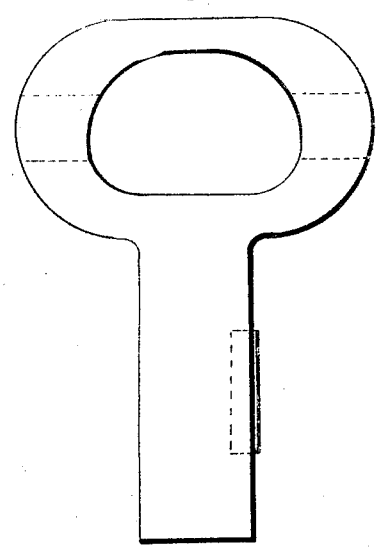
Figure 3:
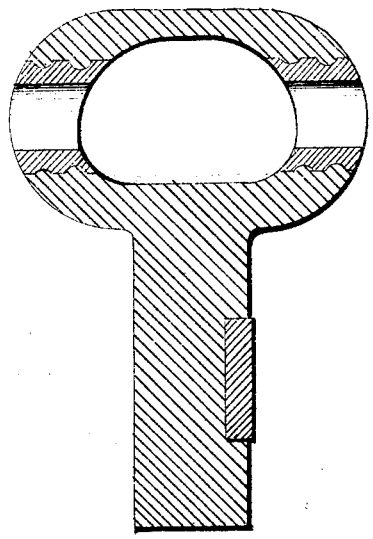

Figure 1 is a view of a raw hide picker as ordinarily constructed. Fig. 2, a view of my improved picker. Fig. 3 a section through the same.

Pickers as heretofore constructed, have been composed of raw hide the two ends being joined together at *a* Fig. 1, by nails, rivets, or otherwise.

My invention consists in making a picker without a seam or joint, which I accomplish by the employment of hard rubber as the material of which the pickers are manufactured, this material being vulcanized in the customary manner in suitable molds. Pickers thus constructed possess many advantages over the raw hide pickers, among which may be enumerated their diminished cost and the facility which they afford for the application of Babbitt-metal bearings *b*—Fig. 3 for the wires upon which the picker runs; these may be inserted before the rubber is vulcanized, and thus be held in place by their form without other fastenings for the purpose.

What I claim as my invention is—

A new article of manufacture, a picker made of hard vulcanized rubber without seams in the manner set forth.

THOS. J. MAYALL.

Witnesses:
P. E. TESCHEMACHER,
SAM. COOPER.